United States Patent [19]

Nidiffer et al.

[11] Patent Number: 4,813,622
[45] Date of Patent: Mar. 21, 1989

[54] DISCHARGE CHUTE UNIT FOR COFFEE GRINDERS

[75] Inventors: Charles A. Nidiffer, Decatur; James H. Anson, Auburn; Daniel R. Ephraim, Glenco; Philip C. Ephraim, Evanston, all of Ill.

[73] Assignee: Bunn-O-Matic Corporation, Springfield, Ill.

[21] Appl. No.: 190,877

[22] Filed: May 6, 1988

[51] Int. Cl.$^4$ ............................................. B02C 19/00
[52] U.S. Cl. ........................................................ 241/100
[58] Field of Search .................... 99/286; 241/36, 100, 241/261.1, 260, 259, 258, 257 R; 141/10

[56] References Cited

U.S. PATENT DOCUMENTS

| | | | |
|---|---|---|---|
| 2,309,246 | 1/1943 | Henry | 241/100 X |
| 2,852,202 | 9/1958 | Ditting et al. | 241/100 X |
| 3,094,290 | 6/1963 | Engl | 241/100 |
| 4,685,624 | 8/1987 | Nidiffer et al. | 241/100 |
| 4,714,206 | 12/1987 | Nidiffer et al. | 241/100 |
| 4,749,134 | 6/1988 | VanCamp | 241/100 |

*Primary Examiner*—Mark Rosenbaum
*Attorney, Agent, or Firm*—Lockwood, Alex, FitzGibbon & Cummings

[57] ABSTRACT

A discharge chute unit is provided for attachment to a coffee grinder which has a discharge opening in the underside of a grinding chamber. The upper end of the discharge chute unit is mounted under the discharge opening and provided with de-chaffing the de-plugging means. A baffle is pivotally mounted in the upper end of the chute unit below the de-chaffer and de-plugger and normally biased in a position to deflect the flow of ground coffee and chaff toward the back side or rear wall of the chute member. The free discharge of chaff into the chute unit is prevented by a de-chaffer having reed-like de-chaffing members which yieldably obstruct the inlet opening into the chute unit without overly interfering with the discharge and flow of ground coffee from the grinding chamber into the chute unit. The pivotally mounted baffle carries on a support rod one element for depressing the reed-like members so as to provide a de-plugging opening and another element which is located in the discharge opening of the grinding chamber for knocking or breaking up ground coffee that has become lodged and caked in the opening. Manual pivoting of the baffle actuates both the element which depresses the de-chaffer reeds and the de-plugging or knockout bar.

10 Claims, 4 Drawing Sheets

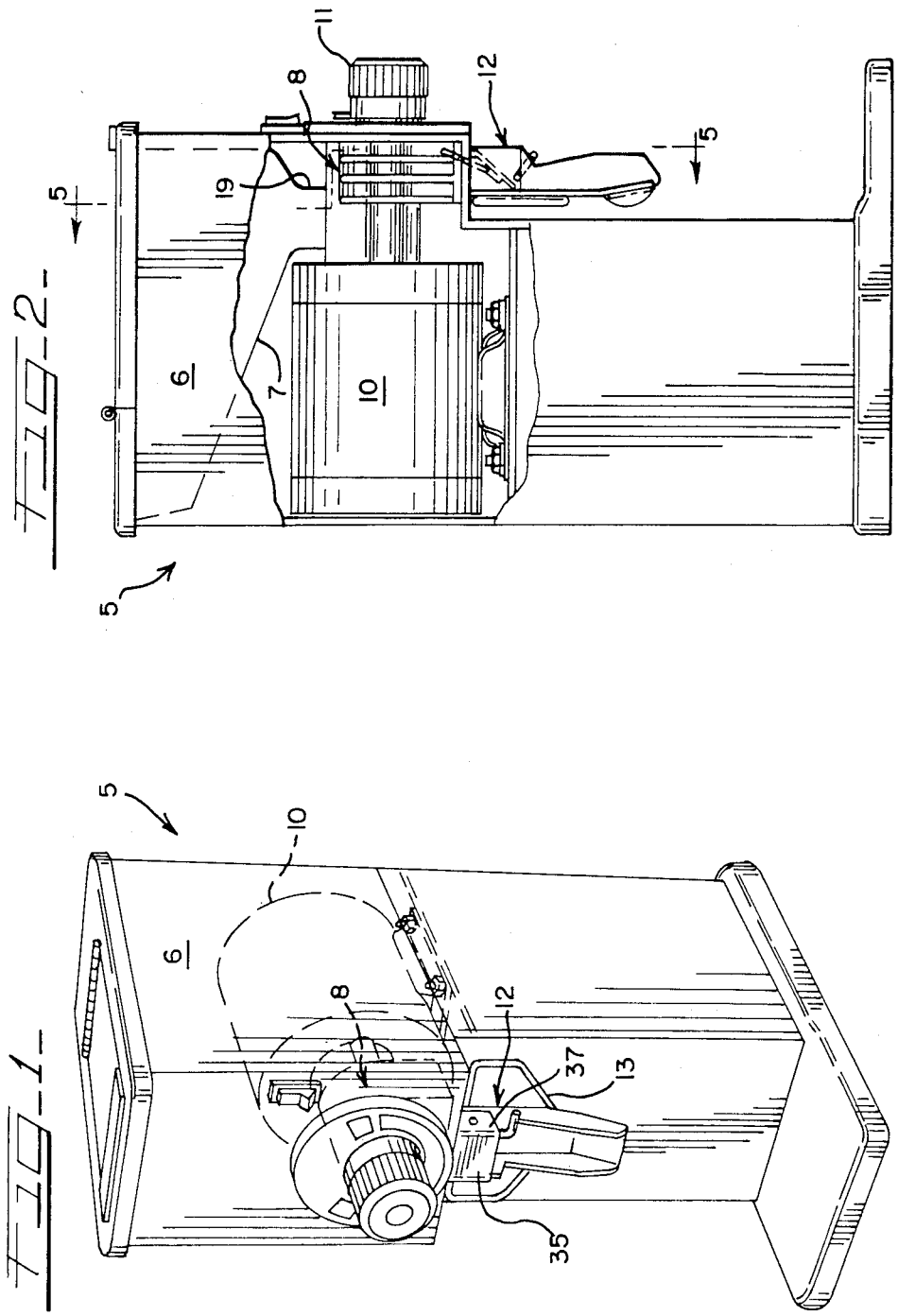

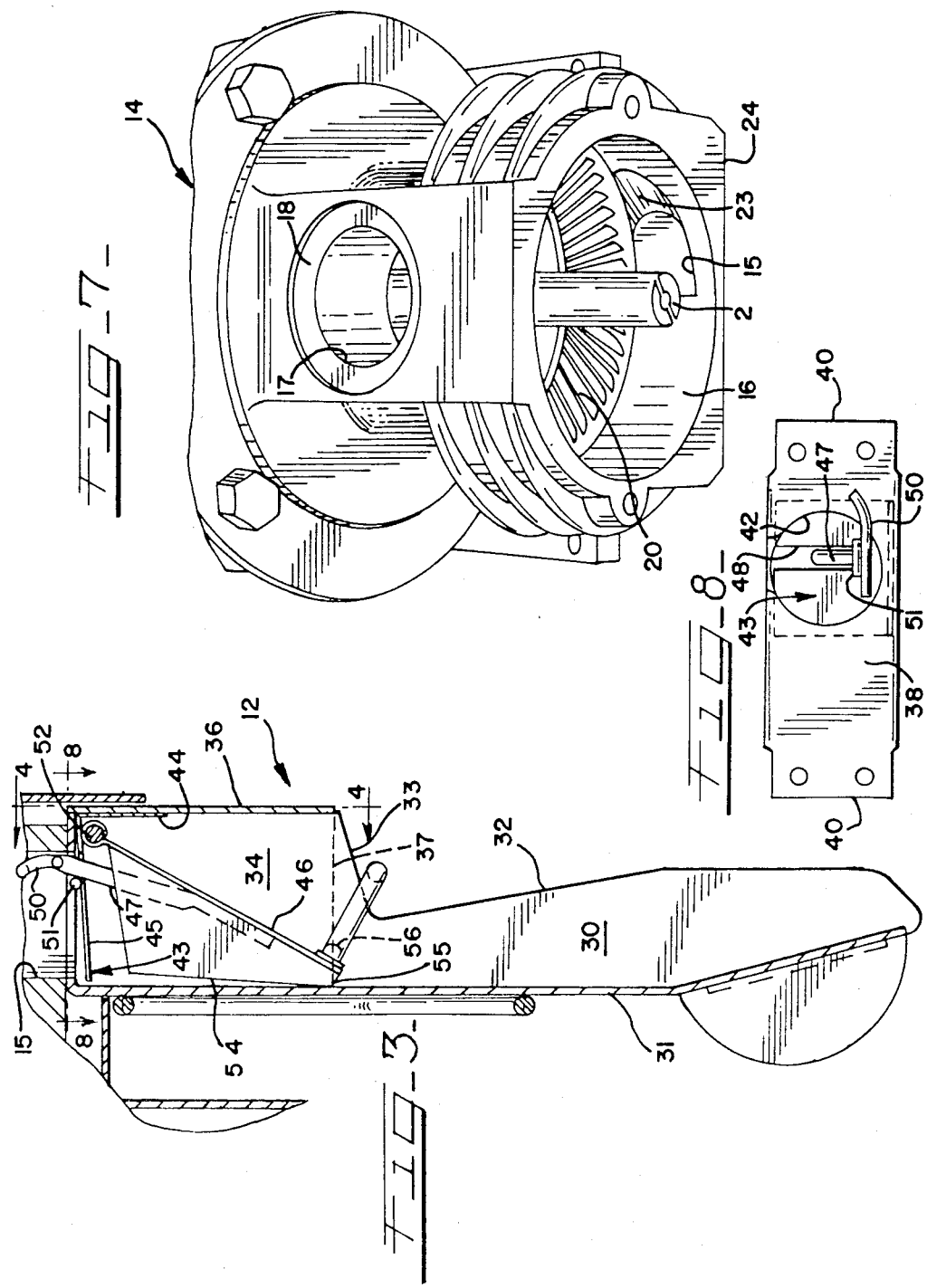

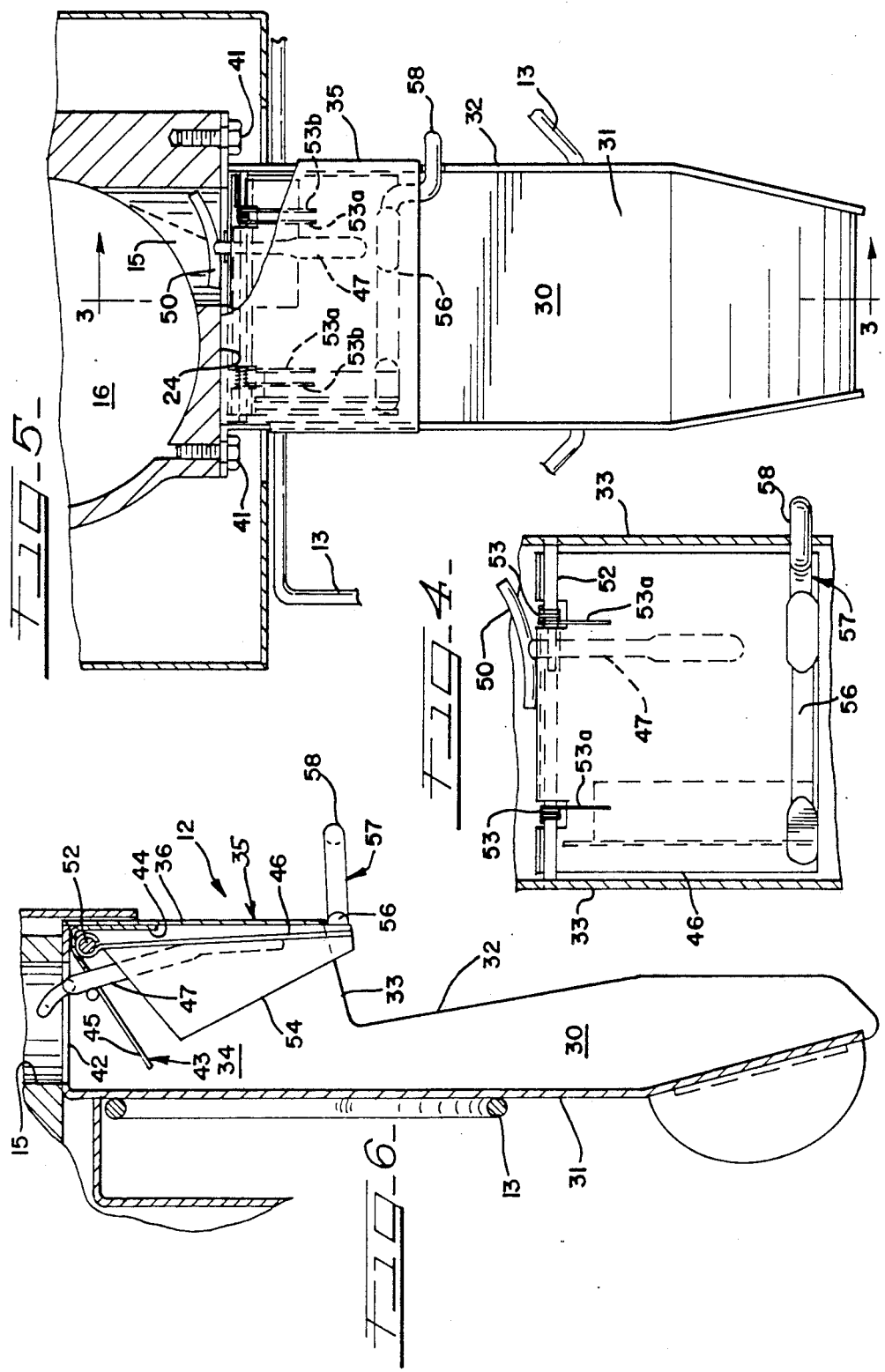

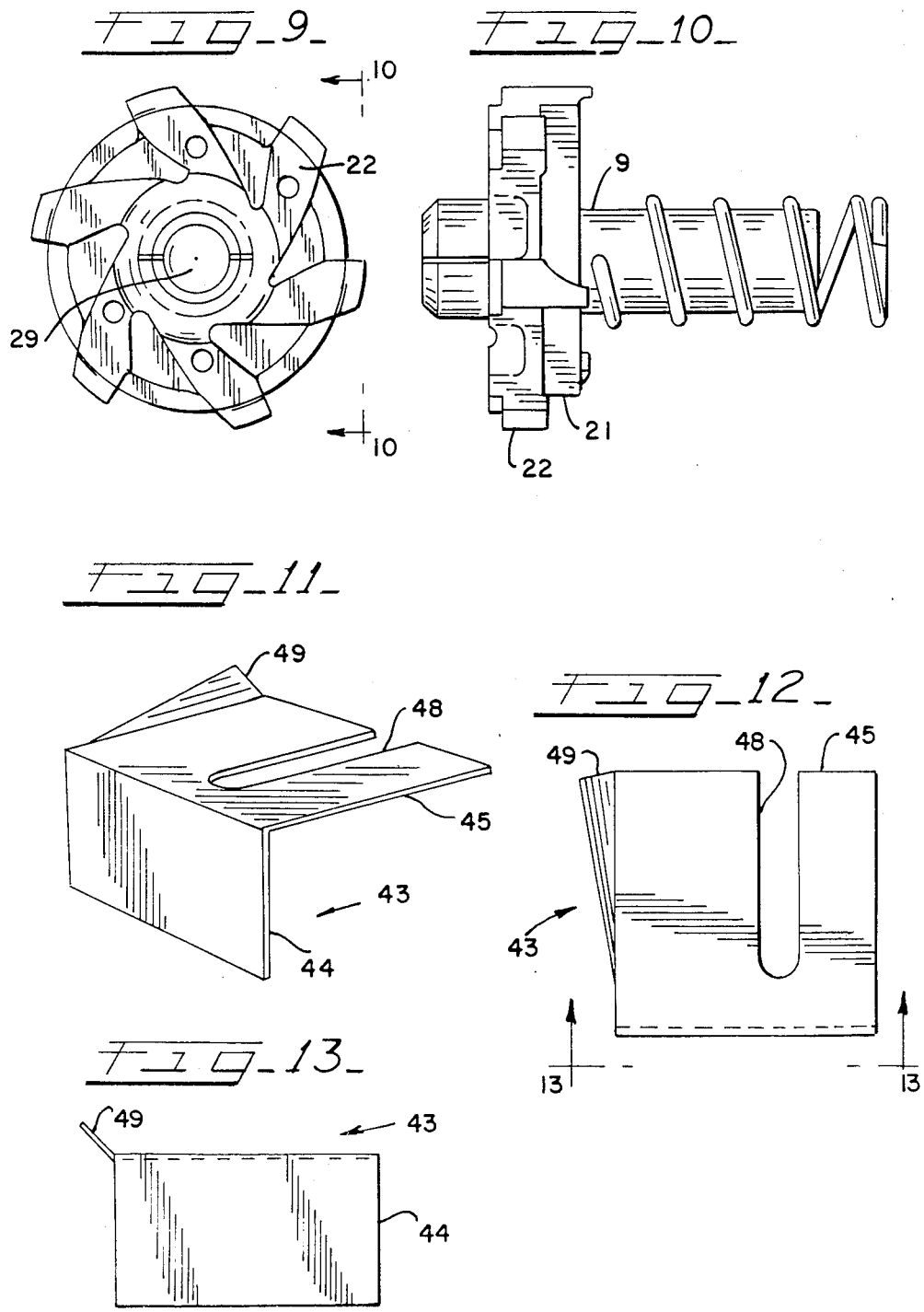

DISCHARGE CHUTE UNIT FOR COFFEE GRINDERS

This invention relates to improvements and innovations in discharge chute units or combinations for attachment to coffee grinders which have downwardly facing discharge openings. More particularly, the invention resides in providing such discharge chute units with de-chaffing and de-plugging means.

One type of grinder for roasted coffee beans which is widely used in retail establishments, supermarkets, restaurants and offices has grinding chambers with bottom outlet openings through which ground coffee of the desired degree of fineness discharges under the combined influence of gravity and impelling action into the upper ends of attached discharge chute units for collection in bags or other containers.

Certain types of coffee beans as they are being ground create chaff problems while certain other types create plugging or caking problems as ground coffee is being discharged. The types of beans which create the most severe chaff problem, create the least plugging or caking problem. Contrarywise, the types of beans which create the most severe plugging or caking problem, create little or no chaff problem. In order to prevent or minimize the chaff problem, it was already known to locate yieldable reed-like obstructions in the top openings into discharge chute units. These reed-like obstructions were flexible so as to not to unduly interfere with the free flow of ground coffee while adequately obstructing or suppressing the escape of chaff. Unfortunately, de-chaffers having these reed-like obstructions tended to exascerbate the plugging or caking problem encountered with beans exhibiting these properties. Accordingly, a solution has been desired in the form of a discharge chute unit that would provide both chaff preventing or suppressing action and also de-plugging action, depending on which type of beans were being ground.

The object of this invention, generally stated, is the provision of discharge chute units for coffee grinders having downwardly facing discharge openings which units incorporate both de-chaffing and de-plugging means.

An important object of the invention is the provision of discharge chute units for coffee grinders with discharge openings in their undersides which incorporate both de-chaffing and de-plugging means and wherein a baffle is provided for deflecting the ground coffee toward the interior or rear of the chute member at the upper end and is pivoted so as to provide a manual means for de-plugging or de-caking the discharge opening in the grinder and the inlet into the discharge chute unit.

A further object of the invention is the provision of discharge chute units for coffee grinders having grinding chambers with downwardly opening or downwardly facing discharge openings underneath which the upper ends of the discharge chute units are attached with the units having or incorporating de-chaffing and de-plugging means and with the de-chaffing means being self-operating during the discharge of ground coffee and with the de-plugging means being manually operable and the operation of neither the de-chaffer nor the de-plugger interfering with the other.

Certain other objects of the invention will be apparent to those skilled in the art in view of the following detailed description of a presently preferred embodiment taken in connection with the accompanying drawings wherein:

FIG. 1 is a perspective view of a coffee grinder equipped with a discharge chute unit or combination embodying the present invention;

FIG. 2 is a side elevational view of the coffee grinder shown in FIG. 1 and partly broken away so as to show the grinding mechanism in elevation;

FIG. 3 is a vertical sectional view on enlarged scale of the discharge chute unit appearing in FIGS. 1 and 2 and including a fragmentary portion of the grinding chamber showing the discharge opening therein;

FIG. 4 is a fragmentary view partly in section and partly in elevation taken on line 4—4 of FIG. 3;

FIG. 5 is an enlarged view partly in elevation and partly in vertical section and taken generally on line 5—5 of FIG. 2;

FIG. 6 is a view corresponding to FIG. 3 showing the moving or operating parts of the discharge chute unit in one of the positions they normally occupy when being manually operated;

FIG. 7 is a perspective view showing the top of the grinder mechanism casting and the grinding cavity or chamber therein;

FIG. 8 is a top plan view of the top of the discharge chute unit taken on line 8—8 of FIG. 6;

FIG. 9 is a front end elevational view of the impeller forming one part of the rotating elements of the grinder;

FIG. 10 is a side elevational view taken on line 10—10 of FIG. 9;

FIG. 11 is a perspective view of the de-chaffer which is mounted in the top of the discharge chute unit;

FIG. 12 is a top plan view of the de-chaffer; and

FIG. 13 is an elevational view of the de-chaffer taken on line 13—13 of FIG. 12.

In FIGS. 1 and 2, a coffee grinder is indicated generally at 5 which has a housing indicated generally at 6 in the upper part of which is located a hopper 7 for coffee beans to be ground. A grinder mechanism indicated generally at 8 which is driven by an electric motor 10 is located below the hopper 7. By manipulating a serrated knob 11 located on the front of the grinder 5, the degree of fineness to which the beans are ground may be set. Except as pointed out and described below in connection with FIG. 7, the grinder mechanism 8 and its driving relationship with the motor 10 are of a known commercial type.

The ground coffee output of the grinder mechanism 8 is discharged into the upper end of a ground coffee discharge chute indicated generally at 12, into which is incorporated the structural and operating parts and features forming the subject of the present invention. Otherwise, the discharge unit 12 is of known type and details thereof are disclosed in U.S. Pat. Nos. 4,685,624 dated Aug. 11, 1987 and 4,714,206 dated Dec. 22, 1987, the disclosures of which are incorporated by reference herein. Briefly, U.S. Pat No. 4,685,624 discloses a bag actuated switch mechanism and electrical control circuit while U.S. Pat. No. 4,714,206 discloses a bag receiving chute which incorporates a bag spreader corresponding to the bag spreader 13 (FIG. 1).

Referring to FIG. 7, a grinder mechanism casting is indicated generally at 14 which is of known type except with respect to the off-set location and configuration of its discharge opening 15 in the bottom of the grinding chamber 16. The casting 14 has a top inlet opening 17 which has a recessed seat 18 at the top into which sets the bottom end of the discharge spout 19 (FIG. 2) of the hopper 6.

The casting 14 includes a stationary burr ring 20 which cooperates with a rotating burr ring 21 (FIGS. 9 and 10). An impeller wheel 22 is secured to the front side of the rotating burr ring 21 and this assembly fits in the grinding chamber 16 of the casting 14. The assembly is carried on a tubular shaft 9 (FIG. 10) which is telescoped over and is keyed to the drive shaft 29 of the motor 10 in known manner.

The discharge opening 15 in casting 14 is relatively large and is located off-center with respect to the drive shaft 29. Further, the side of the opening 15 away from the shaft 29 is provided with a spoon-like entrance surface 23 which facilitates the discharge of the ground coffee through the opening 15. The bottom edge of the discharge opening 15 is located in the plane of the rectangular horizontal bottom surface 24 of the casting 14. In this connection, it will be understood that the combination rotating burr ring 21 and impeller wheel 22 rotate in a clockwise direction as viewed in FIG. 9 so as to tangentially deliver the ground coffee into the opening 15.

Reference is now made to FIGS. 3–6 for a detailed description of the discharge chute unit 12. The unit 12 comprises a chute member 30 which is generally in the form of a channel having a rear wall or floor 31 with integrally formed sidewall formations 32-32. The upper portions 33 of the sidewalls 32 are relatively wide or deep and form opposite sides of an enclosed upper chute section indicated generally at 34. In addition to the upper sidewall portions 33, this enclosed upper portion is formed by the adjoining portion of the rear or back wall 31 which is integral with the portions 33 and a removable cover 35 having a front or outer wall 36 from the opposite vertical edges of which integral wings 37-37 (FIGS. 1 and 3) extend at right angles so as to fit over the outside surfaces of the upper sidewall portions 33.

The bottom of the enclosed chute section 34 is open while the top thereof is closed by a rectangular cover plate 38 (FIG. 8) which has laterally extending ears 40-40. The ears 40 are apertured so as to receive screws 41-41 (FIG. 5) by means of which the cover plate, and thereby the chute unit 12, is secured to the mating rectangular horizontal surface 24 of the casting 14 by means of screws 41-41. In a preferred construction, the cover plate 38 may be integrally formed as part of the chute member 30 and bent at right angles to the rear wall 31 so as to overlay the top edges of the sidewall portions 33. The rectangular cover plate 38 is provided with a circular opening 42 (FIG. 8) which is in alignment with the opening 15 in the casting as shown in FIG. 6.

As set forth above, there is a requirement that the discharge chute unit 12 be provided with both de-chaffing and de-plugging means and capabilities. The de-chaffing means or de-chaffer is indicated generally at 43 (FIGS. 11–13) and takes the form of piece of thin spring metal stock bent at right angles so as to have one leg 44 by which it is spot welded or otherwise secured to the inside of the front wall 36 (FIGS. 3 and 6) of the cover 35. The other leg 45 is free to flex downwardly on the underside of the opening 42. Preferably, an integral upturned triangular piece 49 on leg 45 engages the underside of the cover 38 so as to prevent the leg 45 from engaging the cover 38. The flexing nature of the the leg 45 is such that it has a reed-like action so that it will flex downwardly sufficiently so as to not to interfere with the discharge of the ground coffee through the opening 42 while at the same time obstructing and suppressing the escape of chaff from the grinder chamber 16 through the discharge chute 12.

While the de-chaffer 43 provides the required or desired de-chaffing action, it tends to exascerbate the formation of plugs or cakes of ground coffee in the opening 15 which occurs with certain types of beans as mentioned above. The de-plugging means of the chute unit 12 is provided by a combination of cooperating elements including a pivoted baffle 46 (FIGS. 3, 4 and 6) which carries an upwardly extending clean-out rod 47 on its inner or upper surface with the upper portion thereof projecting through an accommodating slot 48 (FIGS. 8, 11 and 12) in the flexible leg 45 of the de-chaffer 43. A curved de-plugging bar 50 is mounted on the upper end of the rod 47 so as to fit in the discharge opening 15 in the casting 14 but without projecting into the grinding chamber 16 and thereby interfere with the rotating burr wheel 21 or impeller wheel 22. Also mounted on the rod 47 adjacent its upper end and below the de-plugger bar 50 is a horizontal depressor rod segment 51 which engages the top surface of the de-chaffer leg 45 on opposite sides of the slot 48.

The baffle 46 is pivoted at its upper end on a horizontal hinge pin or rod 52 the opposite ends of which are supported in openings in the sidewall portions 33 of chute 30 as shown in FIG. 4. A pair of coil springs 53-53 (FIG. 4) are mounted on the pin or rod 52 with the opposing free ends 53a and 53b (FIGS. 4 and 5) of the springs 53 compressed or trapped between the underside or outer surface of the baffle 46 and the inner surface of the front cover portion 36 of the cover 35. Accordingly, the baffle 46 is normally biased into its upturned position shown in FIG. 3. The baffle 46 is provided with a stop flange 54 (FIGS. 3 and 6) so that the bottom edge thereof will engage the floor or rear wall 31 of the chute member 30 and thereby prevent the lower end of the baffle 46 from engaging the wall 31. This results in a discharge slot opening 55 (FIG. 3) being maintained for the discharge of ground coffee and chaff.

In addition to deflecting the flow or discharge of ground coffee and chaff toward the rear wall or back side 31 of the chute 32, the baffle 46 also provides a means for actuating the de-plugging bar 50 and the de-chaffer depressing bar or element 51. To accomplish this, the baffle 46 adjacent its lower outer edge has secured thereto an arm or leg 56 (FIGS. 4 and 6) of a lever indicated generally at 57 which includes a protruding manipulating handle 58. By means of the handle 58, the baffle 46 may be pivoted down and outwardly from its normal deflecting position shown in FIG. 3 to its outer non-deflecting position shown in FIG. 6. In doing so, it will be seen that the de-plugging member 50 is caused to swing in the opening 15 of the casting 14 thereby dislodging or breaking up plugs or cakes of ground coffee which may have formed therein. At the same time, the cross bar 51 causes the reed-like de-chaffer leg 45 to bend downwardly as shown in FIG. 3 so as to provide an adequate opening for the escape of broken up cakes or plugs of ground coffee lodged in opening 15.

When the baffle 46 is manipulated by the handle 58, an impacting action is imparted to the upper end of the chute unit 12 which materially tends to dislodge and free pieces or fragments of plugs or cakes of ground coffee or plugs that may be remaining in the unit. While the impact caused by the baffle striking the front cover 44 when the baffle is pivoted down is significant, the impact action may be even greater when the handle 58 is released and the springs 53 cause the stop member 54 to impact or strike against the rear wall 31. The resulting jolting or jarring action is not detrimental but is of material assistance in freeing fragments of cakes or plugs to ground coffee.

What is claimed is:

1. Ground coffee discharge chute means for attachment to a coffee grinder which has a grinding chamber having a bottom discharge opening in the underside thereof, said chute means comprising, a chute having sidewalls projecting outwardly from the rear wall of said chute means with the upper ends of said sidewalls terminating on opposite sides of said discharge opening and adjacent to said underside of said grinding chamber, downwardly flexible reed means mounted so as to underlie at least a major portion of said discharge opening and deflect flow of ground coffee and chaff therethrough toward said chute rear wall, a baffle pivotally mounted between said sidewalls adjacent said upper ends thereof and pivotal between a position in which it deflects ground coffee discharging through said discharge opening towards said chute rear wall and a non-deflecting position, manual actuating means mounted on said baffle for pivoting it from its said deflecting position to its said non-deflecting position, and reed depressing means mounted on said baffle and having operative engagement with said flexible reed means whereby when said baffle is pivoted from its said deflecting position said reed means is flexed downwardly so as to reduce said flow deflecting action thereof.

2. The ground coffee discharge chute means of claim 1 wherein caked ground coffee agitator means is mounted on said baffle and extends upwardly into said discharge opening in said grinding chamber.

3. The ground coffee discharge chute means of claim 2 wherein said reed depressing means and said caked ground coffee agitator means are mounted on a common support.

4. The ground coffee discharge chute means of claim 2 wherein spring means biases said baffle towards its said ground coffee deflecting position and stop means to allow downward discharge of ground coffee.

5. The ground coffee discharge chute of claim 4 wherein said stop means is mounted on said baffle.

6. The ground coffee discharge chute means of claim 1 wherein said reed means flexes downwardly under action of ground coffee being discharged through said discharge opening.

7. The ground coffee discharge chute means of claim 1 wherein a cover is mounted on the top end of said chute means having an entrance opening therein aligned with said discharge opening in said grinding chamber and means for attaching said cover to the underside of said grinding chamber.

8. The ground coffee discharge chute means of claim 7 wherein said downwardly flexible reed means is formed of thin spring metal bent into two legs one of which underlies said entrance opening in said cover and is free to flex and the other of which is secured to a rigid part of said discharge chute means.

9. The ground coffee discharge chute means of claim 8 wherein said leg which is free to flex has an upwardly bent portion which engages the underside of said cover and maintains said leg which is free to flex in a partially depressed position.

10. Ground coffee discharge chute unit for attachment to a coffee grinder which has a casting having, a grinding chamber in which a burr ring-impeller wheel assembly rotates on a horizontal drive shaft, and a discharge opening in the bottom of said casting located at least partially to the side of said drive shaft on which said impeller wheel has a downward rotation;

said ground coffee discharge unit comprising, a chute having sidewalls the upper ends of which are located on opposite sides of said casting discharge opening when said discharge chute unit is attached to said casting, a first cover closing the upper end of said chute and having a ground coffee receiving opening thereon aligned with said casting discharge opening when said discharge chute unit is attached to said casting, a de-chaffer mounted in the upper end of said chute with reed-like means underlying at least most of said receiving opening and downwardly inclined toward the rear wall of said chute, a second cover extending between the upper positions of said sidewalls and thereby enclosing the upper portion of said chute downwardly from adjacent said first cover, a baffle pivotally mounted in said enclosed upper portion so as to reside in a normal inclined position in which it deflects ground coffee and chaff entering through said receiving opening toward said chute rear wall, means for pivotally mounting the upper end of said baffle in the upper end of said enclosed upper portion and adjacent said second cover, spring means disposed in said enclosed upper portion and biasing said baffle in its said normal inclined position, handle means mounted on said baffle for swinging it from its said normal position into a retracted position adjacent said second cover, a clean-out rod mounted on said baffle and having an upper end portion which extends through a slot in said reed-like means and terminates in said casting discharge opening, a depressor bar mounted on said clean-out rod and engageable with the upper side of said reed-like means on opposite sides of said slot therein, and a knock-out bar mounted on the upper end of said clean-out rod and disposed in said casting discharge opening, the swinging of said baffle from its said normal position to its said retracted position causing said depressor bar to downwardly depress said reed-like means and said knock-out bar to swing in said casting discharge opening.

* * * * *